(12) United States Patent
Salgues et al.

(10) Patent No.: US 9,540,110 B2
(45) Date of Patent: Jan. 10, 2017

(54) AEROPLANE EQUIPPED WITH AN INTERNAL ESCAPE HATCH INCORPORATING A PRESSURE REGULATING SYSTEM

(71) Applicant: Airbus Operations SAS, Toulouse (FR)

(72) Inventors: Patrick Salgues, Toulouse (FR); Anne-Laure Neveu, Toulouse (FR)

(73) Assignee: Airbus Operations SAS (FR)

( * ) Notice: Subject to any disclaimer, the term of this patent is extended or adjusted under 35 U.S.C. 154(b) by 32 days.

(21) Appl. No.: 14/750,114

(22) Filed: Jun. 25, 2015

(65) Prior Publication Data
US 2015/0375866 A1    Dec. 31, 2015

(30) Foreign Application Priority Data
Jun. 27, 2014  (FR) ..................................... 14 56027

(51) Int. Cl.
*B64C 1/32*    (2006.01)
*B64D 13/04*   (2006.01)
*B64C 1/14*    (2006.01)

(52) U.S. Cl.
CPC .............. *B64D 13/04* (2013.01); *B64C 1/1423* (2013.01); *B64C 1/32* (2013.01)

(58) Field of Classification Search
CPC ........ B64C 1/32; B64C 1/1407; B64C 1/1423; E05B 65/1033
See application file for complete search history.

(56) References Cited

U.S. PATENT DOCUMENTS

| | | | | |
|---|---|---|---|---|
| 2,455,157 | A | * | 11/1948 | Bigelow ................... B64C 1/32 182/77 |
| 3,144,224 | A | * | 8/1964 | Carroll ..................... B64C 1/32 244/129.5 |
| 4,552,326 | A | * | 11/1985 | Bokalot ................ B64C 1/1407 244/129.5 |
| 5,305,969 | A | | 4/1994 | Odell et al. |
| 8,434,720 | B2 | * | 5/2013 | Depeige ................ B64C 1/1407 244/129.5 |
| 8,459,701 | B2 | * | 6/2013 | Szarszewski ......... B64C 1/1407 244/129.4 |
| 2003/0127563 | A1 | * | 7/2003 | LaConte ................... B64C 1/14 244/129.1 |

OTHER PUBLICATIONS

French Search Report (FR 14 56026) dated Feb. 26, 2015.

* cited by examiner

*Primary Examiner* — Philip J Bonzell
*Assistant Examiner* — Michael Kreiner
(74) *Attorney, Agent, or Firm* — Lerner, David, Littenberg, Krumholz & Mentlik, LLP

(57) ABSTRACT

An aeroplane includes an external skin and an internal bulkhead delimiting a cabin, and an escape opening passing through the external skin and the internal bulkhead. The escape opening is closed off by an external escape hatch disposed flush with the external skin. The aeroplane also includes an internal escape hatch that closes off the escape opening disposed flush with the internal bulkhead, and pressure regulating means capable of automatically triggering an opening of the internal escape hatch or a part of the internal escape hatch when a pressure differential on both sides of the internal escape hatch exceeds a determined value.

12 Claims, 5 Drawing Sheets

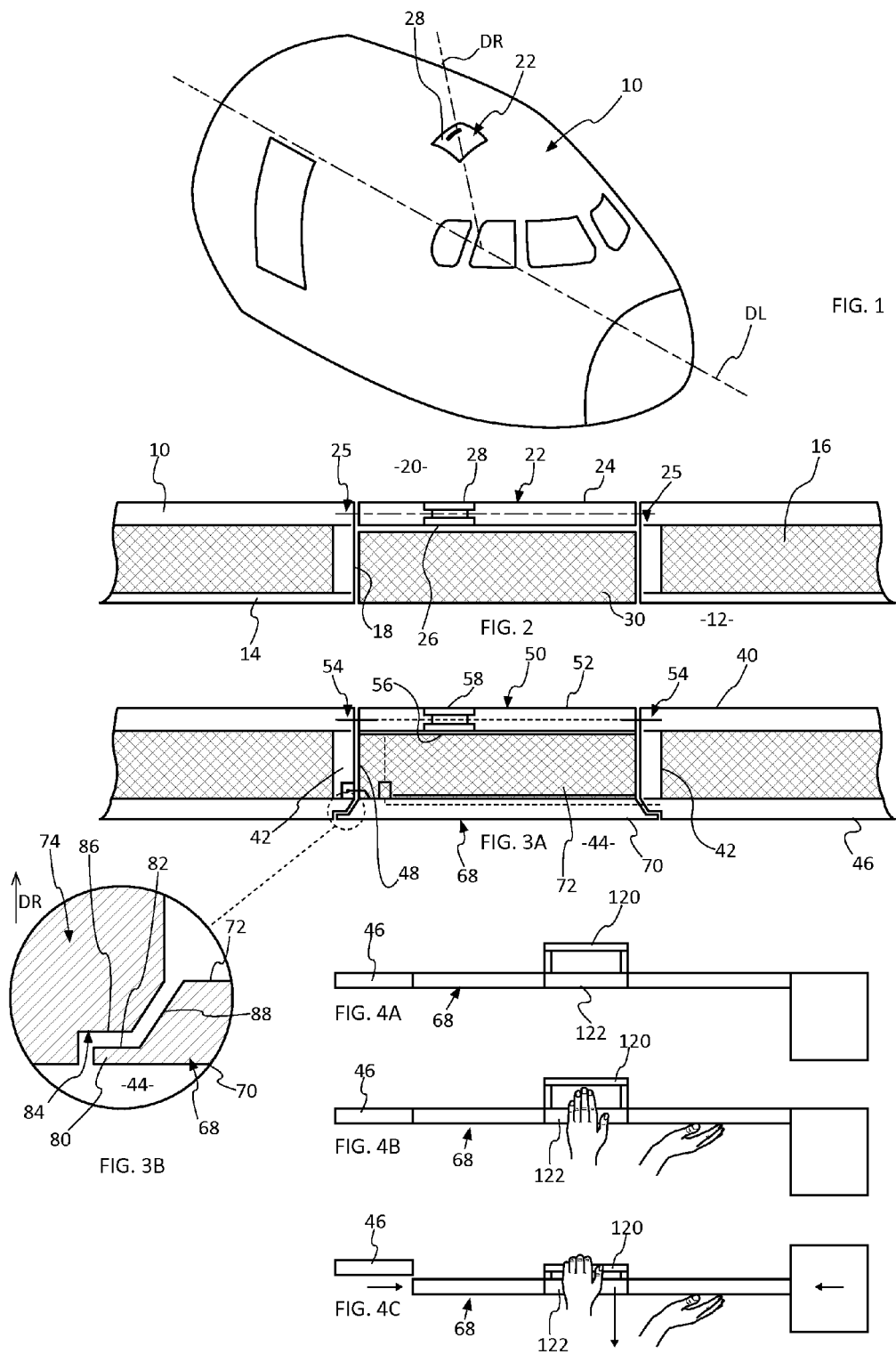

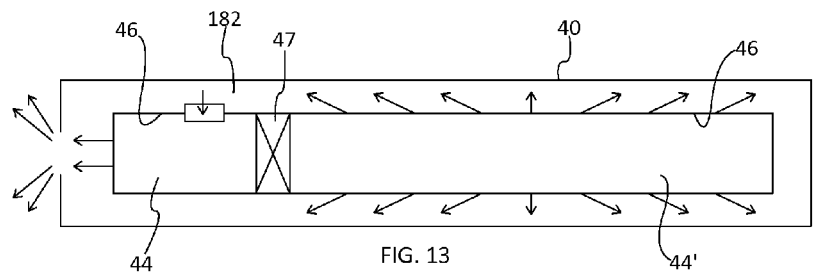
FIG. 13
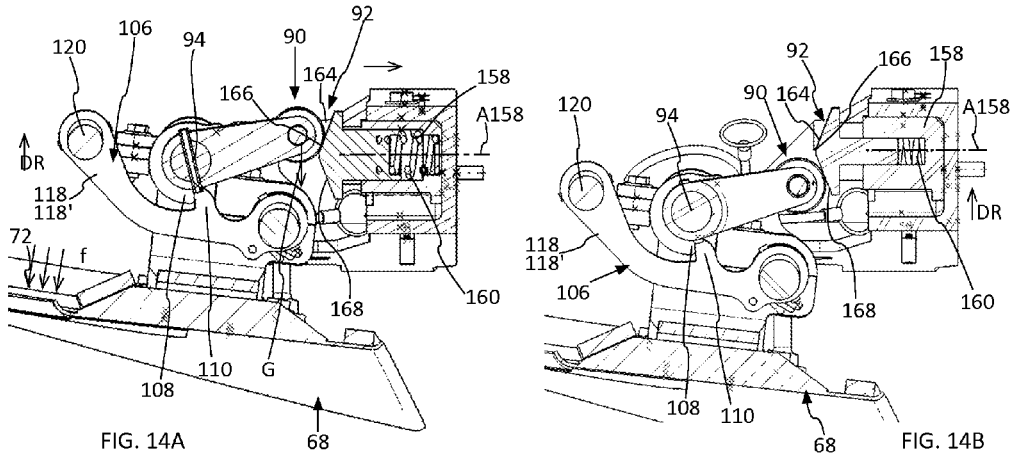
FIG. 14A
FIG. 14B
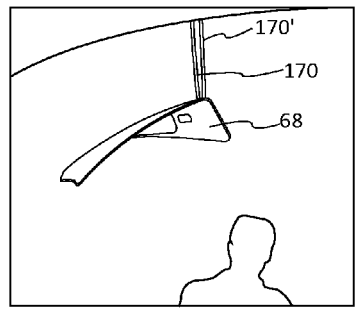
FIG. 15
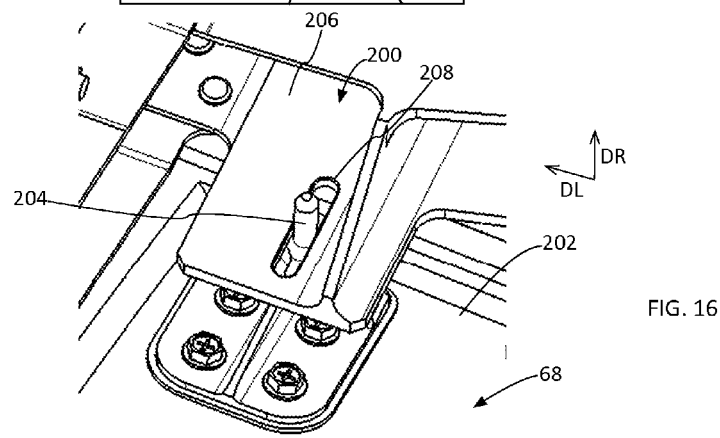
FIG. 16

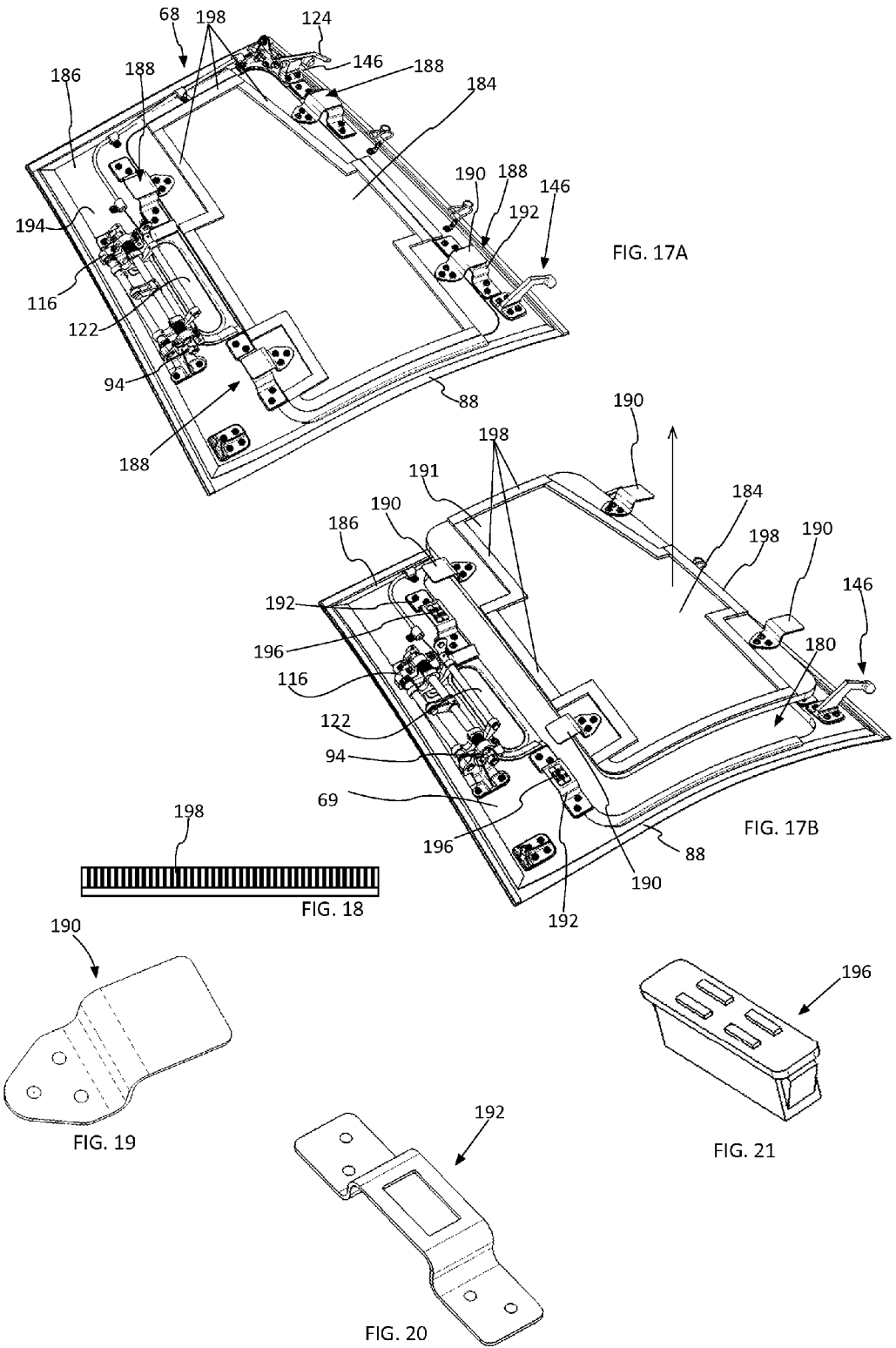

AEROPLANE EQUIPPED WITH AN INTERNAL ESCAPE HATCH INCORPORATING A PRESSURE REGULATING SYSTEM

FIELD OF THE INVENTION

The present invention relates to an aeroplane equipped with an internal escape hatch which incorporates a pressure regulating system.

BACKGROUND OF THE INVENTION

As illustrated in FIG. 2, an aeroplane comprises a skin 10 that forms the fuselage, a passenger cabin (not shown) delimited by an internal bulkhead, and a pilot cabin 12 delimited by an internal bulkhead 14. Various components are disposed between the skin 10 and the internal bulkhead 14, for example insulation blankets 16.

In order to evacuate the passengers and/or the pilots, the aeroplane comprises an opening 18 for bringing the inside of the cabin 12 into communication with the outside 20 of the aeroplane, and at least one escape hatch 22 for closing off or freeing the opening 18. According to an example that is visible in FIG. 1, this escape hatch 22 is positioned in the upper part of the fuselage, vertically above the pilot cabin 12. This escape hatch 22 comprises a wall having an external surface 24 flush with the external surface of the skin 10 of the fuselage. This escape hatch 22 comprises locking/unlocking means 25 that are controlled by an internal opening controller that is actuable from inside the fuselage, and by an external opening controller 28 that is actuable from outside the fuselage. Inside the fuselage, at the opening 18, it is necessary to provide a lining element 30 in the opening 18 against the escape hatch in order to ensure the continuity of the internal bulkhead 14 of the cabin 12.

In parallel, the pilot and passenger cabins are separated by a separating bulkhead which comprises a door for connecting the two cabins.

In the case of sudden depressurization or overpressure in one or other of the cabins, it is necessary to re-establish the balance of the pressures on both sides of the separating bulkhead in order to avoid damaging said bulkhead or its door. To this end, the separating bulkhead and/or its door comprise at least one pressure regulation system making it possible to balance the pressures on both sides of the separating bulkhead in case of overpressure or depressurization in one or other of the cabins. Such a system occupies a significant area of the walls of the cabin. In some aeroplanes, an insufficient portion of the walls of the cabin is available to allow for the installation of pressure regulation systems. These regulation systems are then inadequate in the case of very abrupt depressurization, which can lead to a risk of damage to the separating bulkhead or its door.

BRIEF SUMMARY OF THE INVENTION

Thus, the present invention proposes a solution aiming to remedy the drawbacks of the prior art.

To this end, a subject of the invention is an aeroplane comprising an external skin and an internal bulkhead delimiting a cabin, and comprising an escape opening passing through said external skin and said internal bulkhead, said escape opening being closed off by an external escape hatch disposed flush with the external skin, characterized in that the aeroplane comprises:

an internal escape hatch that closes off said escape opening disposed flush with the internal bulkhead, and pressure regulating means capable of automatically triggering an opening of said internal escape hatch or a part of said internal escape hatch when a pressure differential on both sides of said internal escape hatch exceeds a determined value.

Thus, the internal escape hatch is used as means for re-balancing the pressures of two cabins separated by a separating bulkhead upon a depressurization or an overpressure in one or other of the cabins, the balancing of pressure being applied between the cabin equipped with the internal escape hatch and the space between the internal bulkheads of the cabins and the outer skin of the fuselage.

This internal escape hatch can be used alone or as a complement to another pressure re-balancing means.

According to another feature, the pressure regulation means comprise at least one stop that is movable along a sliding axis between a protruding position in which it retains the internal escape hatch and a retracted position in which it no longer retains the internal escape hatch and allows it to be opened.

Advantageously, the stop comprises a return means which thrusts the stop into the protruding position, said return means being gauged as a function of the pressure differential needed to provoke the automatic triggering of the opening.

According to another feature, the stop comprises a front face with a first inclined surface which makes it possible to convert a thrust force of the catch perpendicular to the sliding axis into a movement of the stop along the sliding axis against the return means.

According to another feature, the internal escape hatch comprises a catch which is movable between a locked state and an unlocked state, said catch bearing against the stop in the locked state for keeping said internal escape hatch in a closed position and the catch comprises at least one arm fixed to a shaft that pivots about a rotation axis with respect to a holder connected to the internal escape hatch, said rotation axis and said arm being configured such that in the locked state, the arm or an element carried by the arm is in contact with the stop, and such that in the unlocked state, the arm or an element carried by the arm is spaced apart from the stop and allows the internal escape hatch to be opened. Advantageously, the arm carries at its free end a roller configured to roll against the stop.

According to another feature, the internal escape hatch is connected to the aeroplane by at least one strap. Advantageously, in order to be connected to the internal escape hatch, each strap comprises a ring, and in that the shaft which supports the catch comprises, for each strap, a hook having an end which bears against a bearing surface when the catch is in the locked state and which is spaced apart from said bearing surface when the catch is in the unlocked state, the hook passing through the ring in the locked state.

Preferably, each bearing surface comprises a pointed end inclined towards the inside of the cabin.

According to another feature, the internal escape hatch comprises an opening and in that the pressure regulation means comprise an overpressure panel configured to block said opening, said overpressure panel being linked to the rest of the internal escape hatch by a link which prevents any movement of the overpressure panel towards the inside of the cabin and which allows a movement of the overpressure panel in the direction of the external escape hatch when a force exerted on the overpressure panel in the direction of the external escape hatch exceeds a certain threshold. Advantageously, the link comprises lugs made of ferromagnetic material, fixed onto the outer face of the overpressure panel and which come to protrude at the periphery of said overpressure panel, for each lug, a holder fixed onto the remainder of the internal escape hatch and a magnetic element fixed onto the holder and disposed under the lug.

BRIEF DESCRIPTION OF THE DRAWINGS

Further features and advantages will become apparent from the following description of the invention, said description being given purely by way of example, with reference to the appended drawings, in which:

FIG. 1 is a perspective front view of an aeroplane, illustrating an external escape hatch, FIG. 2 is a schematic section through an escape opening, illustrating the prior art, FIG. 3A is a schematic section through an escape opening, illustrating the invention, FIG. 3B is a section illustrating a detail of FIG. 3A, FIGS. 4A to 4C are diagrams which illustrate the principle of operation of an internal escape hatch that is actuated from the inside, FIG. 13 is a diagram which illustrates depressurization of a pilot cabin of an aeroplane, FIGS. 14A and 14B are sections through the control mechanism for the movement of the catch during depressurization of a pilot cabin, FIG. 15 is a front view which illustrates the internal escape hatch after opening on account of depressurization of the pilot cabin, FIG. 16 is a perspective view which illustrates in detail a centring pin that is used to position the internal escape hatch, FIGS. 17A and 17B are views of the external face of an internal escape hatch before and after an overpressure in the pilot cabin, FIG. 18 is a side view of the water-absorbing element, FIG. 19 is a perspective view of a lug for holding an overpressure panel of an internal escape hatch, FIG. 20 is a perspective view of a holder for a permanent magnet of an overpressure panel of an internal escape hatch, and FIG. 21 is a perspective view of a permanent magnet of an overpressure panel of an internal escape hatch.

DETAILED DESCRIPTION

Figure 5:
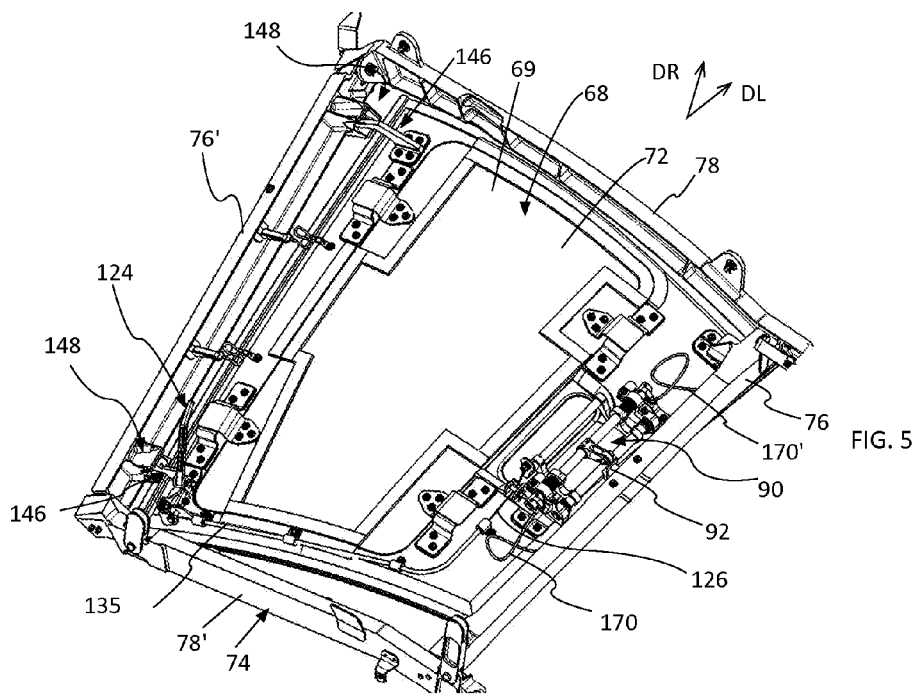
FIG. 5 is a perspective view from the outside of an internal escape hatch, illustrating one embodiment of the invention.

FIG. 3A shows a part of an aeroplane which comprises a fuselage with an external skin 40 attached to a structure 42, and, inside the fuselage, a cabin 44 delimited by an internal bulkhead 46 spaced apart from the skin 40.

As illustrated in FIG. 13, an aeroplane comprises a pilot cabin 44 provided at the front and a passenger cabin 44' behind the pilot cabin 44, separated from the latter by a separating bulkhead 47 which comprises a door for bringing the cabins 44, 44' into communication.

Each cabin 44, 44' is delimited by an internal bulkhead 46. Various elements are interposed between the skin 40 and the internal bulkhead 46, such as insulation blankets, for example.

According to an embodiment that is illustrated in FIG. 3A, the aeroplane comprises at least one escape opening 48, which makes it possible to bring the inside of a cabin 44 into communication with the outside of the aeroplane and which opens out at the skin 40 forming the fuselage and at the internal bulkhead 46 of the cabin 44. Preferably, this internal bulkhead 46 extends, at least around the opening 48, approximately parallel to the skin 40 and at a distance from this skin. In one installation, the escape opening 48 leads onto the upper part of the fuselage. It is preferably positioned above the seat of the third occupant of the pilot cabin 44 or not quite vertically above this seat, as shown in FIG. 15. This installation is preferred since it affords better accessibility from the various positions on the pilot cabin.

For the rest of the description, as indicated in FIG. 1, a longitudinal direction DL corresponds to the direction which extends from the front tip to the rear tip of the aeroplane. A transverse plane is a plane perpendicular to the longitudinal direction. A radial direction DR is a direction perpendicular to the longitudinal direction.

In one configuration, the escape opening 48 is delimited by a perimeter comprising a front edge comprised in a first transverse plane, a rear edge comprised in a second transverse plane, a lower edge and an upper age parallel to the longitudinal direction and rounded portions connecting the front, rear, lower and upper edges.

However, the invention is not limited to this geometry for the perimeter of the opening.

The escape opening 48 is closed off by a removable external escape hatch 50 flush with the skin 40, said external escape hatch 50 having a geometry adapted to that of the escape opening 48 and comprising a wall with an external surface 52 flush with the external surface of the skin 40 of the fuselage when the external escape hatch 50 closes off the escape opening 48. The external escape hatch 50 comprises locking/unlocking means 54 that are controlled by an internal opening controller 56 that is actuable from inside the fuselage and by an external opening controller 58 that is actuable from outside the fuselage.

Figure 10:
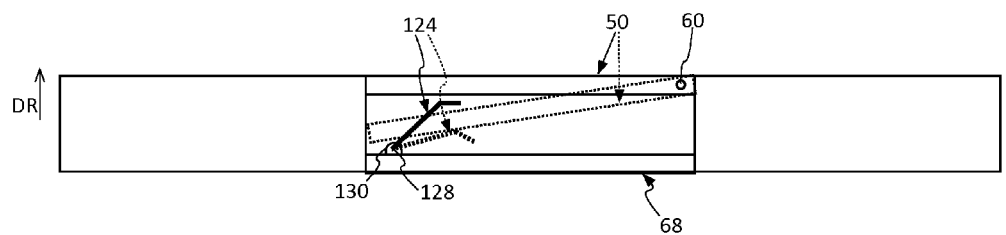
FIG. 10 is a diagram which illustrates the principle of operation of an internal escape hatch that is actuated from the outside.

According to an embodiment illustrated in FIG. 10, the external escape hatch 50 is connected to the rest of the fuselage of the aeroplane by a pivot pin 60. When the locking/unlocking means 54 are in the unlocked state, the external escape hatch 50 can pivot about the pivot pin 60 towards the inside of the fuselage.

In another embodiment, the external escape hatch 50 carries an element which is moved towards the inside of the fuselage when the external opening controller 58 is actuated.

The external escape hatch 50 is not described further, since it can be identical to that of the prior art.

According to one feature of the invention, the aeroplane comprises, at the escape opening 48 and the internal bulkhead 46, an internal escape hatch 68 that is movable between a closed position, in which it closes off the escape opening 48, and an open position, in which it frees the escape opening 48. The internal escape hatch 68 comprises a rigid or semi-rigid panel 69 having an internal surface 70 disposed flush with the internal surface of the bulkhead 46 in the closed position, and an external surface 72 oriented towards the external escape hatch 50.

In one configuration, the aeroplane comprises a frame 74 which surrounds the escape opening 48 and which cooperates with the internal escape hatch 68, the periphery of which coincides with that of the frame 74, so as to obtain leaktightness between the frame 74 and said internal escape hatch 68. This frame 74 comprises an upper edge 76 and a lower edge 76' that are approximately parallel to the longitudinal direction, and also a rear edge 78 in one transverse plane and a front edge 78' in another transverse plane.

Preferably, as shown in FIG. 3B, the internal escape hatch 68 has shapes complementary to those of the frame 74 so as to limit the movement of the internal escape hatch 68 in the radial direction DR towards the outside of the aeroplane and to allow movements of the internal escape hatch towards the inside of the aeroplane, on account in particular of the weight of the internal escape hatch 68.

According to one embodiment, the internal escape hatch 68 comprises a lip 80 which prolongs the internal surface 70 of said hatch 68 and which forms a contact surface 82 that is approximately perpendicular to the radial direction DR and bears against the frame 74 or the internal bulkhead 46 in the closed position. In addition, the frame 74 or the internal bulkhead 46 comprises an indentation 84 having a contact surface 86 against which the lip 80 bears when the internal escape hatch 68 is in the closed position, said indentation 84 being dimensioned to house the lip 80 and such that the internal surface 70 of the internal escape hatch 68 is flush with the internal surface of the bulkhead 46. According to one embodiment, the lip extends around the entire periphery of the internal escape hatch 68.

In one configuration, the internal escape hatch 68 has shapes complementary to those of the frame 74 or the internal bulkhead 46 so as to help the centring thereof with respect to the frame 74 or the internal bulkhead 46.

According to one embodiment, the internal escape hatch 68 has a peripheral edge face 88 in the form of a truncated pyramid, which helps in centring (visible in FIGS. 3B and 17A).

The internal escape hatch 68 comprises at least one catch 90 configured to take up a locked state in which the catch 90 keeps said internal escape hatch 68 in the closed position, and an unlocked state in which the catch 90 allows said internal escape hatch 68 to be opened, in particular under the effect of gravity.

In the locked state, the catch 90 cooperates with at least one stop 92 carried by the frame 74.

In one configuration, the stop 92 is positioned on the upper edge 76 of the frame 74, equidistantly from the rear and front edges 78, 78'. The stop 92 protrudes with respect to the upper edge 76 and extends towards the lower edge 76' approximately perpendicularly to the longitudinal direction DL and to the direction DR.

The stop 92 is positioned with respect to the catch 90 so as to prevent the internal escape hatch 68 from moving when said catch 90 is in the locked state. According to the embodiment, the stop 92 is positioned under the catch 90 (offset towards the inside of the cabin) when the latter is in the locked state.

Regardless of the embodiment, the structure of the aeroplane comprises, for each catch 90, at least one stop 92 which immobilizes the catch 90 in a radial direction DR towards the inside of the aeroplane. Advantageously, the structure of the aeroplane comprises two stops, a first stop which immobilizes the catch 90 in a radial direction DR towards the inside of the aeroplane and a second stop which immobilizes the catch 90 in a radial direction towards the outside of the aeroplane. According to one embodiment, the second stop corresponds to the contact surface 86 of the indentation 84 of the frame 74 or of the internal bulkhead 46.

Although it is described with a single catch, the internal escape hatch 68 may comprise a plurality of catches, each of which is associated with at least one stop.

Preferably, the catch 90 is able to rotate with respect to a rotation axis 94 approximately parallel to the longitudinal direction DL. To this end, the internal escape hatch 68 comprises a pivoting connection with a rotation axis 94 for connecting the catch 90 to the panel 69 of the internal escape hatch 68, the rotation axis 94 being at a distance from the stop 92.

According to one embodiment, the connection between the catch 90 and the panel 69 comprises on the one hand a holder connected to the internal escape hatch 68 in the form of a yoke 96 having two cylindrical bearing surfaces 96a and 96b with coaxial axes coincident with the rotation axis 94, and on the other hand a shaft 98 which pivots in the two cylindrical bearing surfaces 96a and 96b and to which the catch 90 is connected.

The catch 90 comprises at least one arm 100 that is perpendicular to the rotation axis 94 and fixed rigidly to the shaft 98. The rotation axis 94 and the arm 100 are configured such that in the locked state, the arm 100 or an element carried by the arm is in contact with the stop 92, and in the unlocked state, the arm 100 or an element carried by the arm is spaced apart from the stop and allows the internal escape hatch 68 to be opened.

According to one embodiment, the catch 90 pivots about the rotation axis 94, in the anticlockwise direction, through an angle of around 120° between the locked state and the unlocked state.

Figure 7:
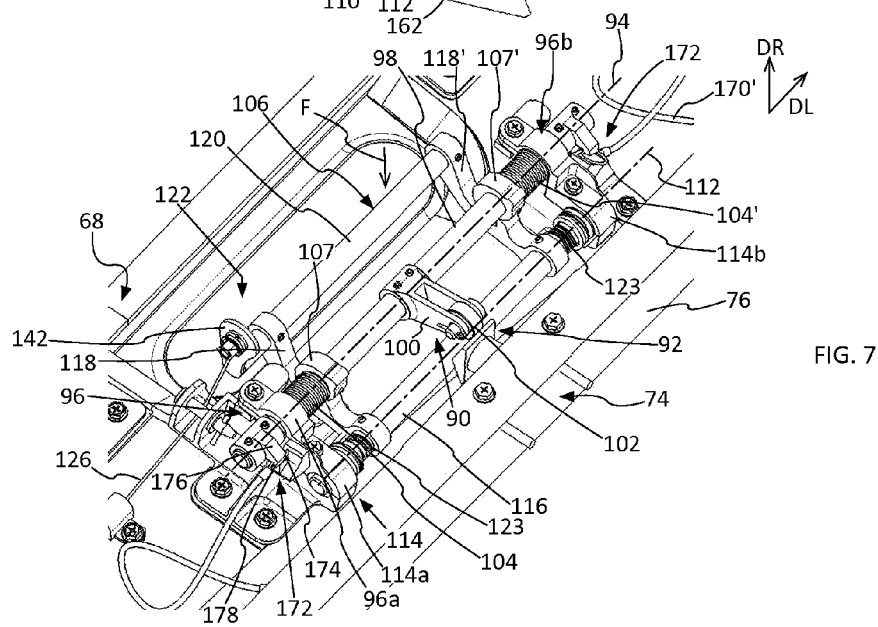
FIG. 7 is a perspective view which illustrates in detail the control mechanism for the movement of the catch.

According to an embodiment that is visible in FIG. 7, the catch 90 comprises two parallel arms 100. Advantageously, the catch 90 comprises at its end a roller 102 which is designed to roll on the stop 92. According to one embodiment, the two arms 100 carry at their free ends an axle on which the roller 102 is mounted in a pivoting manner.

Of course, the invention is not limited to these dynamics for the catch 90. Instead of pivoting, the catch could move in translation between a first position in contact with the stop 92, which corresponds to the locked state, and a position spaced apart from the stop 92, which corresponds to the unlocked state. However, the embodiment illustrated in the figures is preferred, since the rotation of the catch 92 about a rotation axis 94 makes it possible to obtain a lever effect.

The internal escape hatch comprises at least one mechanism for controlling the movement of the catch 90.

Preferably, this mechanism comprises at least one return means which causes the catch 90 to tilt in the unlocked state. According to one embodiment, the mechanism for controlling the movement comprises two springs 104, 104' around the shaft 98, which cause the catch 90 to rotate in the unlocked state.

In addition to the one or more return means 104, 104', the mechanism comprises at least one locking handle 106 which immobilizes the catch 90 in the locked state, counter to the one or more return means 104, 104'.

Figure 6:
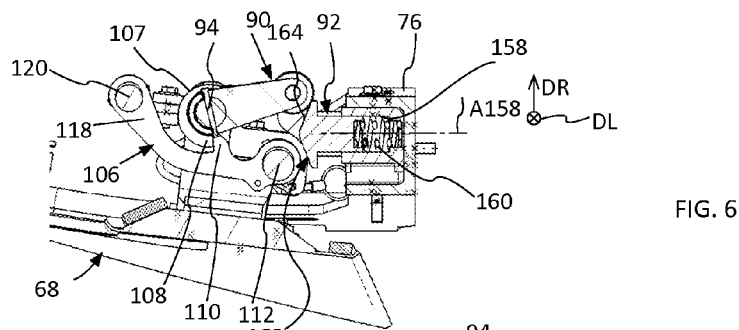
FIG. 6 is a section through a control mechanism for the movement of a catch illustrated in FIG. 5.

According to an embodiment that is visible in FIGS. 6 and 7, the shaft 98 comprises at least one collar 107 having at least one detent 108 at its periphery. This detent 108 has a contact surface passing through the rotation axis 94. Preferably, the shaft 98 comprises two collars 107, 107' that are disposed in a symmetrical manner with respect to the catch 90, each of said collars 107, 107' comprising a detent 108.

In addition, the locking handle 106 comprises at least one protrusion 110, one for each detent 108.

Preferably, the locking handle 106 is able to rotate about a rotation axis 112 between:
- a first position corresponding to the locked state of the catch 19, in which the locking handle 106 prevents the catch 90 from rotating, the protrusion 110 of the locking handle 106 bearing against the detent 108 of the shaft 98, and
- a second position, in which the locking handle does not prevent the catch 90 from rotating, the protrusion 110 being spaced apart from the detent 108 of the shaft 98.

Preferably, the rotation axis 112 is parallel to the rotation axis 94 of the catch 90.

According to one embodiment, the locking handle 106 is connected to the panel 69 by a pivoting connection which comprises:
- a yoke 114 connected to the panel 69 with two cylindrical bearing surfaces 114a and 114b having coaxial axes coincident with the rotation axis 112,
- a shaft 116 forming part of the locking handle 106 or connected to the latter, which pivots in the two cylindrical bearing surfaces 114a and 114b.

Preferably, the yokes 96 and 114 form a single assembly.

According to one embodiment, the locking handle 106 also comprises the shaft 116, two mutually parallel arms 118, 118' that are perpendicular to the rotation axis 112, and a controller 120 in the form of a bar, the arms 118, 118' connecting the shaft 116 and the controller 120, the arms 118, 118' each being disposed in line with a detent 108 and comprising a protrusion 110.

At least one return means makes it possible to keep the locking handle 106 in the first position in which it prevents the catch 90 from rotating. According to one embodiment, two springs 123 are used as return means.

According to one configuration, the arms 118, 118' carrying the protrusions 110 are offset towards the inside of the aeroplane with respect to the rotation axis 94. Thus, a traction force F towards the inside of the aeroplane that is exerted on the controller 120 causes the locking handle 106 to rotate, thereby freeing the catch 90, the latter pivoting into the unlocked state on account of the one or more return means 104, 104'.

The invention is not limited to these dynamics for the locking handle 106. Thus, instead of pivoting, the locking handle 106 could move in translation. However, the variant with a rotational movement about the rotation axis 112 makes it possible to obtain a lever effect, the controller 120 being spaced apart from the rotation axis 112 by a greater distance than the protrusion(s) 110.

The one or more return means 104, 104' which cause the catch 90 to tilt into the unlocked state make it possible to separate the force necessary for causing the catch 90 to tilt from the force to be applied to the controller 120 in order to cause the locking handle 106 to rotate.

Thus, the invention makes it possible to reduce the traction force F exerted on the controller 120 in order to cause the change of state of the catch 90 and to cause the internal escape hatch 68 to open.

According to another feature of the invention, the passage of the catch 90 from the locked states of the unlocked state is controlled by two controllers, a first opening controller that is accessible from inside the aeroplane and a second opening controller that is connected to the external opening controller 58 of the external escape hatch 50, thereby making it possible to trigger the opening of the internal escape hatch 68 from outside the aeroplane.

The first opening controller comprises the catch 90 and locking handle 106 described above. They are disposed between the two hatches 50 and 68. Consequently, the panel 69 of the internal escape hatch 68 comprises an opening 122 for making the controller 120 accessible from inside the cabin.

Thus, as illustrated in FIGS. 4A to 4C, in order to open the internal escape hatch 68, a person should pass one hand through the opening 122 and then pull on the controller 120.

The second opening controller is situated between the external hatch 50 and the internal escape hatch 68. It is positioned such that the actuation of the external opening controller 58 of the external escape hatch 50 or the passage of the external escape hatch 50 from the closed position to the open position causes the second opening controller to be actuated.

The second opening controller comprises a lever 124 connected to the locking handle 106 by virtue of a cable 126.

Figure 11:
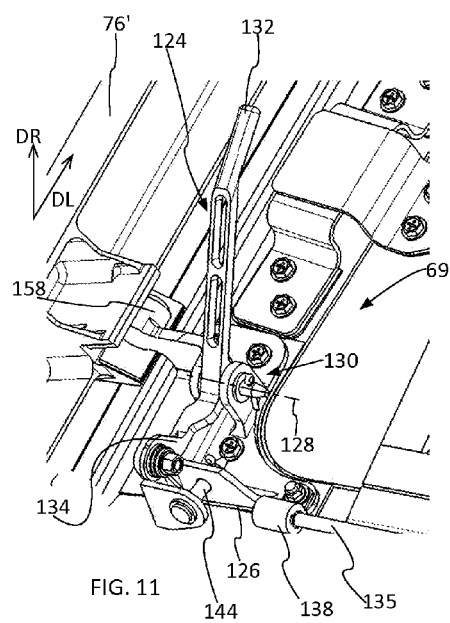
FIG. 11 is a perspective view which illustrates in detail a lever that is actuable by way of an external opening controller for an external escape hatch.

According to an embodiment shown in FIGS. 10 and 11, the lever 124 pivots about a rotary pin 128 secured to the panel 69 by way of a holder 130 fixed to its external surface 72.

The lever 124 comprises a first end 132 positioned so as to be in contact with the external escape hatch 50 or an element carried by said hatch when the external opening controller 58 of the external escape hatch 50 is actuated.

According to one embodiment, the cable 126 is secured to the second end 134 of the lever, the first and second ends 132 and 134 of the lever being disposed on either side of the rotation axis 128, the first end 132 being further away from the rotation axis 128 than the second end 134 in order to obtain a lever effect.

The cable 126 and the lever 124 are arranged such that when the lever 124 tilts, it exerts a traction force on the cable 126.

As indicated above, the cable 126 comprises a first end connected to the lever 124 and a second end connected to the locking handle 106.

Figure 12:
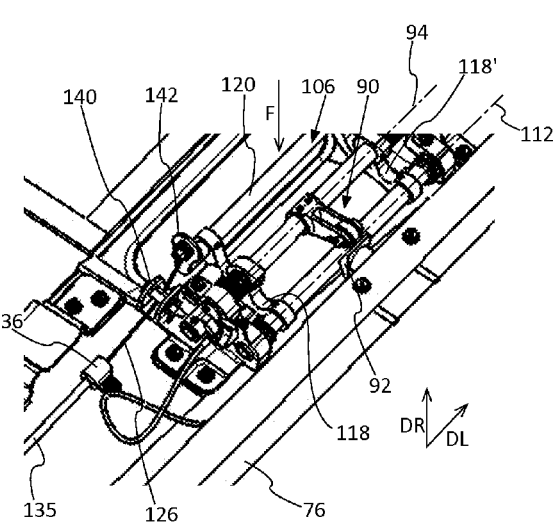
FIG. 12 is a perspective view which illustrates in detail the control mechanism for the movement of the catch when it is actuated from the outside.

According to an embodiment illustrated in FIGS. 11 and 12, the cable 126 is inserted into a sleeve 135 which comprises a first end that is locked by a first holder 136 secured to the panel 69 and close to the locking handle 106, and a second end locked by a second holder 138 secured to the panel 69 and close to the lever 124. At the exit from the second end of the sleeve 135, the cable 126 is parallel to the rotation axes 94 and 112, in line with the controller 120. The panel 69 comprises a turn element 140 so as to orient the cable 126 in a direction perpendicular to the rotation axes 94 and 112 and to the controller 120. Preferably, the locking handle 106 comprises a lug 142 disposed at one end of the controller 120 and perpendicular thereto, the cable 126 being connected to said lug 142.

At the exit from the first end of the sheet 135, the cable 126 is oriented parallel to the rotation axis 128 of the lever 124. The panel 69 comprises a turn element 144 for orienting the cable perpendicularly to the rotation axis 128 of the lever 124 in the pivoting plane of the lever 124.

As illustrated in FIGS. 10 to 12, when the external opening controller 58 of the external escape hatch 50 is actuated, the external escape hatch 50, or an element carried by said hatch, exerts a force on the first end 132 of the lever 124. As a result of this force, the lever 124 pivots as illustrated in FIG. 10. The pivoting of the lever 124 causes a traction force on the cable 126, as illustrated in FIG. 11. The traction force exerted at the first end of the cable 126 is converted at the second end of the cable into a traction force on the locking handle 106, which pivots. By pivoting, the locking handle 106 frees the catch 90, which pivots into the unlocked state. The internal escape hatch 68 is then open.

The second opening controller for controlling the passage of the catch from the locked state to the unlocked state is not limited in this embodiment. Preferably, the second opening controller comprises a lever 124 that is actuable by the external escape hatch 50 and connected to the catch 90, the pivoting of the lever 124 during the opening of the external escape hatch 50 causing the catch 90 to pass from the locked state to the unlocked state.

In one configuration, the upper edge 76 of the frame 74 comprises a stop 92 which cooperates with a catch 90 secured to the panel 69 of the internal escape hatch 68. In addition, the panel 69 comprises two disconnectable hinges at the lower edge 76'. Each disconnectable hinge comprises a finger 146 which engages with a housing 148 provided at the lower edge 76' of the frame 74, as illustrated in FIGS. 5, 8 and 9.

Figure 8:
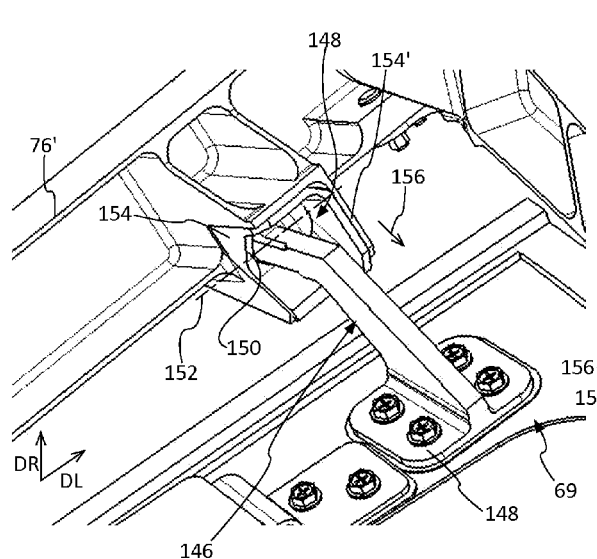
FIG. 8 is a perspective view of a first disconnect of hinge, illustrating one embodiment of the invention.
Figure 9:
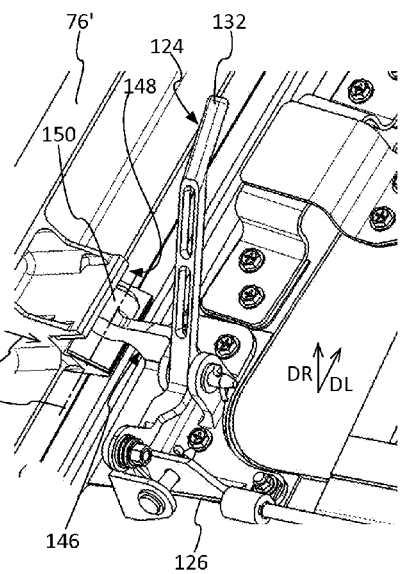
FIG. 9 is a perspective view of a second disconnectable hinge, illustrating one embodiment of the invention.

As shown in detail in FIG. 8, each finger 146 comprises, at a first end, a mounting plate 148 fixed to the panel 69 and, at the other end, a cylindrical form 150 (visible in FIG. 9) having an axis 152 parallel to the rotation axis 94 of the catch 90. At least one housing comprises two side walls 154, 154' which prevent movement in translation in a direction parallel to the axis 152 of the cylindrical form 150 of the finger 146.

Thus, in order to be able to release the internal escape hatch 68 of the opening, it is appropriate, firstly, to tilt the catch 90 into the unlocked state so as to allow said hatch to pivot slightly about the axis 152 of the cylindrical forms 150, which then carry out the function of hinges. By continuing, as illustrated by the arrows 156 in FIGS. 8 and 9, the fingers 146 are disengaged from their housings 148. Consequently, the internal escape hatch 68 is opened and releases the escape opening 48.

According to another feature, the internal escape hatch 68 carries out the function of pressure regulator and opens automatically when a pressure difference on either side of the internal escape hatch 68 exceeds a given value. To this end, it comprises pressure regulating means which automatically trigger the opening of said internal escape hatch 68 when a pressure difference becomes too high on either side of said hatch 68.

Thus, according to a first function, the internal escape hatch 68 automatically opens in the event of depressurization of the pilot cabin 44, as shown in FIG. 13.

To this end, the stop 92 is retractable. As illustrated in FIGS. 6, 14A and 14B, the stop 92 is movable between a protruding position illustrated in FIG. 6, in which it retains the catch 90 and prevents the internal escape hatch 68 from being opened, and a retracted position, illustrated in FIG. 14A, in which it no longer retains the catch 90 and allows the internal escape hatch 68 to be opened. According to one embodiment, the stop 92 slides in a cylindrical bush 158 provided in the upper edge 76 of the frame 74, with a sliding axis A158 approximately perpendicular to the longitudinal direction DL and to the direction DR.

The stop 92 comprises a return means 160, for example a compression spring, which pushes the stop 92 into the protruding position. In parallel, the stop 92 and the bush 158 have complementary shapes in order to prevent the movement in translation of the stop 92 when it reaches the protruding position.

The return means 160 is set depending on the pressure difference necessary to cause automatic triggering of opening of the internal escape hatch 68. By way of example, in the embodiment shown, the pressure difference which triggers opening is between 6 and 9 millibars.

Advantageously, the stop 92 comprises a front face 162 having a bevelled, inclined first surface 164 which makes it possible to convert a crushing force of the catch 90 perpendicular to the sliding axis A158 into a movement of the stop 92 along the sliding axis A158 counter to the return means 160.

According to one embodiment, in a plane containing the directions DL and DR, the front face 162 is domed and comprises, in its upper part, the inclined first surface 164, against which the catch 90 bears in the locked state, as illustrated in FIG. 6, a top 106 against which the catch 90 bears as it passes from the locked state to the unlocked state, as illustrated in FIG. 14A, and, in its lower part, a second inclined surface 168, the inclined surfaces 164 and 168 being approximately symmetric with respect to the sliding axis A158. By way of example, the first inclined surface 164 forms an angle of around 60° with respect to the sliding axis A158.

Preferably, the catch 90 comprise a roller 102 which comes into contact with the stop 92 and which makes it possible to eliminate friction between the catch 90 and said stop 92.

As shown in FIG. 13, the cabins 44 and 44' are separated by a bulkhead. If depressurization occurs in the pilot cabin 44, there is a sudden and large pressure difference between the pilot cabin 44 and the passenger cabin 44'. This pressure difference has an effect on either side of the internal escape hatch 68. Thus, as shown in FIG. 14A, this pressure difference generates forces f at the external surface 72, said forces f pushing the internal escape hatch 68 towards the inside of the cabin. On account of the forces f, the catch 90 exerts on the stop 92 a force G oriented in the direction DR towards the inside of the cabin. When this force G exceeds a threshold value, the stop 92 retracts and no longer retains the catch 90, which passes into the unlocked state, as illustrated in FIG. 14B. The opening of the internal escape hatch 68 makes it possible to re-establish the equilibrium between the two cabins 44, 44'. In order to give an order of magnitude, the threshold value of the force G is around 218 N.

By virtue of the invention, it is possible, in some aeroplanes, to eliminate pressure regulating systems at the separating wall 46 or the door thereof, thereby reducing the on-board mass. In other aeroplanes, the invention makes it possible to supplement existing pressure regulating systems and thus to increase the effectiveness thereof.

According to another feature, the internal escape hatch 68 is connected to the structure of the aeroplane and more particularly to the frame 74 by at least one strap 170. According to one embodiment, the internal escape hatch 68 is connected to the upper edge 76 of the frame by two straps 170, 170'.

This configuration makes it possible to avoid a situation in which the internal escape hatch 68 injures the person sitting under the latter during the automatic triggering of opening of the internal escape hatch 68 in the event of depressurization of the pilot cabin, as illustrated in FIG. 15.

Advantageously, each strap 170 is connected to the escape hatch 68 by a connection 170 which automatically breaks the link between said internal escape hatch 68 and each strap 170, 170' when the catch 90 is in the unlocked state. Specifically, the straps 170, 170' should not impede the opening of the internal escape hatch 68 when the opening thereof is triggered voluntarily by a person pulling on the controller 120.

Preferably, as visible in FIG. 7, each strap 170, 170' comprises at its end a ring 174. In addition, the shaft which holds the catch 90 comprises, for each strap 170, 170', a hook 176, the end of which bears against a bearing surface 178 secured to the panel 69 when the catch 90 is in the locked state. According to one embodiment, the yoke 96 comprises two bearing surfaces 178, one for each strap, that are provided on the outside of the cylindrical bearing surfaces 96a, 96b. Each hook 176 extends in a plane perpendicular to the rotation axis 94 of the shaft 98, at each end of the shaft 98.

For each strap 170, 170', in the locked state, the hook 176 passes through the ring 174 and retains it as long as its end is in contact with the corresponding bearing surface 178. Thus, if the opening of the internal escape hatch 68 is triggered on account of depressurization, with the catch 90 still remaining in the locked state, the straps 170, 170' remain secured to the internal escape hatch 68.

If the opening of the internal escape hatch 68 is triggered voluntarily by a person pulling on the controller 120, then the locking handle 106 frees the shaft 98, which can pivot. The rotation of the shaft 98 causes the catch 90 to pass into the unlocked state and also frees the rings 174, the ends of the hooks 176 being spaced apart from the bearing surfaces 178.

Preferably, each bearing surface 178 comprises a pointed end that is inclined towards the inside of the cabin in order not to retain the ring 174 when each hook 176 is spaced apart from the corresponding bearing surface 178.

According to another function of pressure regulation, the internal escape hatch 68 makes it possible to regulate the pressure in the event of over pressure in the pilot In 44.

To this end, the internal escape hatch 78 comprises an opening 180 (visible in FIG. 17B) which makes it possible to bring the inside of the cabin 44 into communication with the intermediate region 182 (visible in FIGS. 3A and 13) between the internal bulkhead 46 and the skin 40 of the fuselage and an overpressure panel 184 configured to close off said opening 180.

Advantageously, the overpressure panel 184 is as large as possible in order that the pressure is distributed over as large a surface area as possible.

Preferably, the opening 180 is at a distance from the peripheral edge face 88 of the internal escape hatch 68.

According to one embodiment, the panel 69 of the internal escape hatch 68 comprises two parts, a peripheral portion 186 which surrounds the opening 180 and a central portion which corresponds to the overpressure panel 184.

The peripheral portion 186 comprises the opening 122 and carries the yokes 96 and 114, the lever 124 and the disconnectable hinges.

According to one embodiment, the opening 180 and the overpressure panel 140 have the same rectangular peripheral shapes with rounded corners.

Advantageously, the overpressure panel 184 is connected to the peripheral portion 186 by a connection 188 which prevents any movement of the overpressure panel 184 towards the inside of the cabin 44 and which allows the overpressure panel 184 to move in the direction of the external escape hatch 50 when a force exerted on the overpressure panel 184 in the direction of the external escape hatch 50 exceeds a particular threshold.

The connection 188 comprises lugs 190 made of ferromagnetic material that are fixed to the external face 191 of the overpressure panel 184 and which protrude from the periphery of said panel 184 so as to be positioned above the peripheral portion 186. The connection 188 also comprises, for each lug 190, a holder 192 fixed to the external surface 194 of the peripheral portion 186, and a magnetic element 196, such as a permanent magnet, for example, fixed to the holder 192, each magnetic element 196 being disposed under a lug 190. The magnetic force exerted by the magnetic elements 196 is adjusted depending on the desired value for the automatic triggering of opening of the overpressure panel in the event of overpressure inside the cabin 44.

Thus, in the absence of overpressure, the lugs 190 bear against the holders 192 and prevent any movement of the overpressure panel 184 towards the inside of the cabin 44. The magnetic elements 196 keep the lugs 198 pressed against their holders 192 and prevent any movement of the overpressure panel 184 towards the outside of the cabin 44. As soon as the overpressure inside the cabin 44 exceeds a particular threshold, the magnetic force of the magnetic elements 196 is insufficient to retain the lugs 190 and the overpressure panel 146 lifts so as to allow equalization of the pressures on either side of the internal escape hatch 68.

Advantageously, the secondary panel 184 comprises water-absorbing elements 198 at its external face 194.

According to one embodiment, these water-absorbing elements 198 are in the form of strips that are adhesively bonded to the external face 194 of the overpressure panel 184 and arranged so as to form a barrier configured to limit ingress of water into the pilot cabin 44, in particular during the descent phase of flights.

According to another feature, visible in FIG. 16, the internal escape hatch 68 comprises a centring means 200 for simplifying the positioning of said internal escape hatch 68 with respect to the structure of the aeroplane, and more particularly of the catch 90 with respect to the stop 92.

In order to position the upper edge 202 of the internal escape hatch, a centring pin 204 is fixed close to the upper edge 202, on the external surface 72 of said hatch. In addition, a plate 206 having an oblong slot 208 is fixed to the structure of the aeroplane, more particularly to the frame 74. The oblong slot 208 has a width equal, allowing for play, to the diameter of the centring pin 204 and its length is oriented substantially perpendicularly to the longitudinal direction DL and the direction DR, in a direction parallel to the catch 90.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aeroplane comprising an external skin and an internal bulkhead delimiting a cabin, and comprising an escape opening passing through said external skin and said internal bulkhead, said escape opening being closed off by an external escape hatch disposed flush with the external skin, wherein the aeroplane comprises:

an internal escape hatch that closes off said escape opening disposed flush with the internal bulkhead; and pressure regulating means capable of automatically triggering an opening of said internal escape hatch or a part of said internal escape hatch when a pressure differential on both sides of said internal escape hatch exceeds a determined value.

2. The aeroplane according to claim 1, wherein the pressure regulation means comprise at least one stop movable along a sliding axis between a protruding position in which the at least one stop retains the internal escape hatch and a retracted position in which at least one stop no longer retains the internal escape hatch and allows the internal escape hatch to be opened.

3. The aeroplane according to claim 2, wherein the at least one stop comprises a return means which thrusts the at least one stop into the protruding position, said return means being gauged as a function of the pressure differential needed to provoke the automatic triggering of the opening.

4. The aeroplane according to claim 3, wherein the at least one stop comprises a front face with a first inclined surface which makes it possible to convert a thrust force of the catch perpendicular to the sliding axis into a movement of the at least one stop along the sliding axis against the return means.

5. The aeroplane according to claim 4, wherein the front face comprises a second inclined surface symmetrical to the first inclined surface relative to the sliding axis.

6. The aeroplane according to claim 2, wherein the internal escape hatch comprises a catch movable between a locked state and an unlocked state, said catch bearing against the at least one stop in the locked state for keeping said internal escape hatch in a closed position, and wherein the catch comprises at least one arm fixed to a shaft that pivots about a rotation axis with respect to a holder connected to the internal escape hatch, said rotation axis and said arm being configured such that in the locked state, the arm or an element carried by the arm is in contact with the at least one stop, and such that in the unlocked state, the arm or an element carried by the arm is spaced apart from the at least one stop and allows the internal escape hatch to be opened.

7. The aeroplane according to claim 6, wherein the arm carries at its free end a roller configured to roll against the stop.

8. The aeroplane according to claim 6, wherein the internal escape hatch is connected to the aeroplane by at least one strap.

9. The aeroplane according to claim 8, wherein, in order to be connected to the internal escape hatch, each strap comprises a ring, and
wherein the shaft which supports the catch comprises, for each strap, a hook having an end which bears against a bearing surface when the catch is in the locked state and which is spaced apart from said bearing surface when the catch is in the unlocked state, the hook passing through the ring in the locked state.

10. The aeroplane according to claim 9, wherein each bearing surface comprises a pointed end inclined towards the inside of the cabin.

11. The aeroplane according to claim 1, wherein the internal escape hatch comprises an opening, and
wherein the pressure regulation means comprise an overpressure panel configured to block said opening, said overpressure panel being linked to the rest of the internal escape hatch by a link which prevents any movement of the overpressure panel towards the inside of the cabin and which allows movement of the overpressure panel in the direction of the external escape hatch when a force exerted on the overpressure panel in the direction of the external escape hatch exceeds a certain threshold.

12. The aeroplane according to claim 11, wherein the link comprises lugs made of ferromagnetic material, fixed onto the outer face of the overpressure panel and which come to protrude at the periphery of said overpressure panel, for each lug, a holder fixed onto the remainder of the internal escape hatch and a magnetic element fixed onto the holder and disposed under the lug.

* * * * *